(12) United States Patent  
Nakano et al.

(10) Patent No.: US 7,727,923 B2
(45) Date of Patent: Jun. 1, 2010

(54) CATALYST FOR EXHAUST GAS PURIFICATION AND METHOD FOR EXHAUST GAS PURIFICATION

(75) Inventors: Yoshiki Nakano, Hiratsuka (JP); Takanobu Sakurai, Hiratsuka (JP)

(73) Assignee: Nikki-Universal Co., Ltd., Tokyo (JP)

( * ) Notice: Subject to any disclaimer, the term of this patent is extended or adjusted under 35 U.S.C. 154(b) by 619 days.

(21) Appl. No.: 10/599,511

(22) PCT Filed: Mar. 28, 2005

(86) PCT No.: PCT/JP2005/005693

§ 371 (c)(1),
(2), (4) Date: Sep. 29, 2006

(87) PCT Pub. No.: WO2005/094991

PCT Pub. Date: Oct. 13, 2005

(65) Prior Publication Data

US 2007/0259771 A1    Nov. 8, 2007

(30) Foreign Application Priority Data

Mar. 30, 2004  (JP) .............................. 2004-098145

(51) Int. Cl.
*B01J 29/06* (2006.01)
(52) U.S. Cl. .............................. 502/60; 502/63; 502/64; 502/66; 502/69
(58) Field of Classification Search .................. 502/60, 502/63, 64, 66, 69
See application file for complete search history.

(56) References Cited

U.S. PATENT DOCUMENTS

| 5,292,991 | A | * | 3/1994 | Lachman et al. | ............. 585/850 |
| 5,376,610 | A | * | 12/1994 | Takahata et al. | ............... 502/66 |
| 5,733,837 | A | * | 3/1998 | Nakatsuji et al. | ............. 502/304 |
| 6,248,684 | B1 | * | 6/2001 | Yavuz et al. | .................. 502/66 |
| 2001/0053745 | A1 | * | 12/2001 | Kharas et al. | ............... 502/332 |

FOREIGN PATENT DOCUMENTS

| JP | 08-168649 | 7/1996 |
| JP | 2004-066126 | 3/2004 |
| JP | 2004-076717 | 3/2004 |

OTHER PUBLICATIONS

PCT International Search Report for PCT/JP/2005/005693, Jul. 5, 2005 (2 pages).

* cited by examiner

*Primary Examiner*—Elizabeth D Wood
(74) *Attorney, Agent, or Firm*—Fish & Richardson P.C.

(57) ABSTRACT

The challenge for the present invention is to provide a catalyst composition restrained from declining in performance over time in purifying an exhaust gas containing an organic compound a silicon compound, a catalyst containing the catalyst composition, and a method for producing the catalyst.

This challenge is solved by using a catalyst composition containing zeolite added to precious metal-carried alumina, and the silicon resistance of the catalyst is improved greatly. The amount of acid of the zeolite added is preferably in the range of 0.4 mmol·$NH_3$/g to 1.5 mmol·$NH_3$/g.

8 Claims, 5 Drawing Sheets

CATALYST FOR EXHAUST GAS PURIFICATION AND METHOD FOR EXHAUST GAS PURIFICATION

TECHNICAL FIELD

This invention relates to a catalyst composition for purifying an exhaust gas containing an organic compound and a silicon compound, a catalyst containing the catalyst composition, and a method for producing the catalyst.

BACKGROUND ART

Organic compounds, such as benzene, toluene, methyl ethyl ketone, and ethyl acetate, are used as solvents and detergents in wide varieties of fields, such as printing, painting, coating, and electronic materials, and these compounds are partly discharged as an exhaust gas. These organic compounds may include toxic compounds, and may become the cause of a foul odor or air pollution. Thus, the exhaust gas containing such organic compounds needs to be purified. Precious metal-carried alumina catalysts, which oxidize organic compounds to remove them, have hitherto been used as exhaust gas purification catalysts.

The exhaust gas may further contain a silicon compound. For example, an organic silicone compound is excellent in heat resistance and water resistance, and is thus put to various uses. It is often coexistent in the exhaust gas. If a precious metal-carried catalyst is used for treatment of the exhaust gas containing an organic compound and a silicon compound, silicon poisons the precious metal to cause a decrease in catalytic activity (non-patent document 1). Since the silicon compounds is itself harmful, moreover, its removal is also demanded.

In order to maintain the catalytic activity even if the exhaust gas contains the silicon compound, there have been reports (patent documents 1 to 3) on methods which comprise providing an adsorbent, such as zeolite, alumina or activated carbon, containing an alkali metal or an alkaline earth metal, on a side upstream, in the direction of gas passage, of a region where the catalyst is packed (this region will be referred to hereinafter as a "succeeding stage") (the region where the adsorbent is packed will be referred to hereinafter as a "preceding stage") so that silicone is removed in the preceding stage before it arrives at the succeeding stage. According to these methods, however, the reactor needs to be packed with the two types of materials, thus making the structure of the reactor complicated. Furthermore, the preceding stage is poor in oxidative potential, so that high boiling substances, such as tars, are apt to accumulate there, and the accumulated substances may catch fire, causing abrupt heat generation. Thus, a single material which maintains activity for a long term is demanded.

A report has also been issued (patent document 4) on a catalyst, which has a precious metal carried on zeolite, for treatment of the exhaust gas containing a silicon compound. However, it is industrially desirable to use a carrier more inexpensive than zeolite.

As described above, there is a demand for a catalyst for treating an exhaust gas containing a silicon compound, the catalyst maintaining its activity for a long-term. Furthermore, a catalyst, which exhibits excellent performance even at a high space velocity (SV), is demanded in order to treat a large amount of an exhaust gas promptly.

Non-patent document 1: J. Catal., Vol. 86, p. 187 (1984)
Patent document 1: Japanese Unexamined Patent Publication No. 1984-147623
Patent document 2: Japanese Unexamined Patent Publication No. 1998-267249
Patent document 3: Japanese Unexamined Patent Publication No. 1997-85087
Patent document 4: Japanese Unexamined Patent Publication No. 2003-290626

DISCLOSURE OF THE INVENTION

Problems to be Solved by the Invention

The present invention has been accomplished in the light of the above-described situations. The invention provides a catalyst composition which maintains high activity for a long term in the purification of an exhaust gas containing an organic compound and a silicon compound, a catalyst containing the catalyst composition, and a method for producing the catalyst.

Means for Solving the Problems

The inventors diligently conducted studies in an attempt to solve these problems. As a result, they have found that high activity is retained for a long term by using a catalyst composition containing alumina having a precious metal carried thereon, and zeolite. This finding has led to the accomplishment of the present invention. According to this invention, the amount of expensive zeolite used can be cut down, without the need to provide the preceding stage where a silicon compound is removed.

That is, the present invention provides the following:

(1) A catalyst composition for purifying an exhaust gas containing an organic compound and a silicon compound, the catalyst composition containing alumina particles having a precious metal carried thereon, and zeolite particles.

(2) The catalyst composition described in (1), wherein the silicon compound is an organosilicon compound.

(3) The catalyst composition described in (1), wherein the silicon compound is an organic silicone.

(4) The catalyst composition described in any one of (1) to (3), wherein the weight of the zeolite particles relative to the sum of the weight of the alumina particles having the precious metal carried thereon, and the weight of the zeolite particles is in the range of 1 wt. % to 70 wt. %.

(5) The catalyst composition described in any one of (1) to (4), further containing a binder.

(6) The catalyst composition described in any one of (1) to (5), wherein the zeolite particles are zeolite particles having a precious metal carried thereon.

(7) The catalyst composition described in any one of (1) to (6), wherein the precious metal is Pt, Pd, Rh, Ir or Ru, an alloy of any of these, a mixture of these.

(8) The catalyst composition described in any one of (1) to (7), wherein the amount of acid of zeolite is in the range of 0.4 to 1.5 mmol $NH_3$/g.

(9) The catalyst composition described in any one of (1) to (8), wherein the sum of the amount of an oxide converted from an alkali metal contained in the zeolite, and the amount of an oxide converted from an alkaline earth metal contained in the zeolite is 5 wt. % or less based on the total amount of the zeolite.

(10) A catalyst comprising a catalyst substrate; and a catalyst layer formed on the catalyst substrate and containing the catalyst composition described in any one of (1) to (9).

(11) The catalyst described in (10), wherein the average thickness of the catalyst layer is in the range of 10 to 500 μm.

(12) An exhaust gas purification method comprising the step of bringing an exhaust gas containing an organic compound and a silicon compound into contact with the catalyst described in (10) or (11) at a temperature of 200 to 500° C. for reaction thereof.

(13) A method for producing a catalyst for purifying an exhaust gas containing an organic compound and a silicon compound, comprising the steps of: preparing a slurry containing alumina particles having a precious metal carried thereon and zeolite particles; and coating the slurry onto a substrate, followed by drying.

BEST MODE FOR CARRYING OUT THE INVENTION

The catalyst composition of the present invention has silicon resistance improved over conventional ones. The silicon resistance herein refers to the nature that when the catalyst composition is used in the treatment of an exhaust gas containing a silicon compound, changes over time in its catalytic performance are small. Concretely, when an exhaust gas containing an organic compound and a silicon compound is passed through the catalyst, changes over time in the rate of removal of the organic compound are suppressed. The removal rate of the organic compound is represented by the following equation using the concentrations of the organic compound contained in the exhaust gas before and after treatment with the catalyst.

[(concentration of organic compound in untreated exhaust gas−concentration of organic compound in exhaust gas after treatment)/concentration of organic compound in untreated exhaust gas]×100 (%) [Equation 1]

Purification of the exhaust gas refers to decreasing the concentration of at least one of the organic compounds and/or silicon-containing compounds in the exhaust gas.

The silicon compound refers to a compound containing silicon, and includes a compound containing no organic group, such as hydrogen silicide or silicon halide, and a compound containing an organic group. Hereinafter, the silicon compound containing the organic group will be written as the organosilicon compound. Examples of the organosilicon compound include compounds represented by the formula $R_n SiX_{4-n}$ where R is an organic group, and X is selected independently from F, Cl, Br, I, OH, H and amine, and organic silicones. The organic silicones refer to oligomers and polymers having a main chain formed from silicon and oxygen bound together, with the silicon being attached to an organic group. The organic silicones include dimethyl silicone, methyl phenyl silicone, cyclic silicone, fatty acid-modified silicone, and polyether-modified silicone.

There is no limitation on the upper limit of the Si concentration in the exhaust gas which is passed through the catalyst composition and the catalyst of the present invention. However, the Si concentration is 1,000 ppm or less, preferably 100 ppm or less, and more preferably 20 ppm or less. If this range is exceeded, the catalytic activity is apt to decline. Nor is any limitation imposed on the lower limit of the Si concentration. However, if the Si concentration is 0.01 ppm or more, preferably 0.1 ppm or more, and more preferably 1 ppm or more, the effect of the present invention is easy to detect.

The catalyst composition of the present invention contains alumina having a precious metal carried thereon (to be hereinafter referred to as component 1), and zeolite (to be hereinafter referred to as component 2).

As the alumina, any publicly known aluminas can be used, for example, β-alumina, γ-alumina, χ-alumina, κ-alumina, δ-alumina, η-alumina, and θ-alumina. The alumina is preferably porous, and is preferably γ-alumina. The alumina can be produced by firing commercially available alumina sol. The amount of impurities, specific surface area, mean particle diameter, and shape of the alumina can be controlled by selecting raw materials and adjusting the manufacturing conditions. (Hereinbelow, unless otherwise specified, the particle diameter refers to the means particle diameter of secondary particles measured by the laser process, and the shape refers to the shape of the secondary particles.) To improve the efficiency of contact with the exhaust gas, and improve the dispersion of the catalyst components, the specific surface area of the alumina particles is preferably in the range of 50 to 300 m$^2$/g (by the BET process). From the points of view of improvement in contact with the coexistent zeolite particles, formation of a homogenous and smooth catalyst layer on the substrate, and prevention of cracking of the catalyst layer, the particle diameter of the alumina is preferably in the range of 1 to 100 μm. Large particles exceeding 100 μm, as the raw material, are crushed by a ball mill or the like, and used. The shape of the alumina is arbitrary.

The precious metal carried on the alumina is preferably selected from Pt, Pd, Rh, Ir and Ru, their alloys, and mixtures of these. There is no limitation on the amount of the precious metal in the catalyst, and this amount is determined depending on the form of the catalyst, such as the thickness of the catalyst layer formed on the catalyst substrate, as well as the type of the organic compound in the exhaust gas, and reaction conditions such as the reaction temperature and SV. Typically, the amount of the precious metal per m$^2$ of the catalyst layer is in the range of 0.05 to 2.0 g, although it depends on the type of the substrate, for example, the number of cells in a honeycomb. If the amount is less than the above range, removal of the organic compound in the exhaust gas is not sufficient. If the amount exceeds the above range, there is no economy. The amount of the precious metal in component 1 is preferably in the range of 0.5 to 10 wt. %.

For the carriage of the precious metal, various methods which have been publicly known can be used, including the impregnation method and the wash coat method. The source of the precious metal may be precious metal particles or a precious metal compound, and a water-soluble salt of the precious metal is preferred. For example, a nitrate, a chloride, and an ammine complex of the precious metal can be named as the preferred precious metal source. Concrete examples are chloroplatinic acid, palladium nitrate, rhodium chloride, and an acidic aqueous solution of dinitrodiaminoplatinum in nitric acid. These precious metal sources may be used alone or in combination.

As a means of carriage in ordinary use, the alumina particles are impregnated with an aqueous solution of the above-mentioned precious metal compound, followed by drying, firing, and reduction, whereby the precious metal-carried alumina (component 1) is obtained. As the method of reduction, there is named heating in a hydrogen-containing atmosphere, or a liquid-phase reaction using a reducing agent such as hydrazine. (7) The catalyst composition described in any one of (1) to (6), wherein the precious metal is Pt, Pd, Rh, Ir or Ru, an alloy of any of these or a mixture of these.

There is no limitation on the particle diameter of the zeolite particles as component 2. However, the particle diameter is preferably in the range of 1 to 100 μm, as is that of the particles as component 1, from the viewpoint of improvement in contact with the particles as component 1 in the catalyst layer.

Herein, the amount of acid of the zeolite is indicated by the amount of elimination of $NH_3$ at 160 to 550° C. in the ammonia adsorption method, and is expressed as the number of millimoles of eliminated $NH_3$ per gram of the zeolite. The amount of acid of the zeolite used in the present invention is 0.4 mmol/g or more, preferably 0.5 mmol/g or more, more preferably 0.6 mmol/g or more. Although there is no limitation on the upper limit of the amount of acid, 1.5 mmol/g or less, preferably 1.2 mmol/g or less, of zeolite is easily available. If a mixture of plural types of zeolites is used, the amount of acid is determined by the average of the weights of the amounts of acid of the respective zeolites.

The $SiO_2/Al_2O_3$ (molar ratio) of the zeolite used in the present invention is selected depending on the structure of the zeolite. To improve silicon resistance, however, it is 1 or more, preferably 2 or more, more preferably 5 or more, but 50 or less, preferably 30 or less In the case of zeolite of the HY type, the $SiO_2/Al_2O_3$ (molar ratio) is in the range of 5 to 50. For representative zeolites of the A type and the X type, the $SiO_2/Al_2O_3$ (molar ratio) is 2 and 2 to 3, respectively.

The sum of the amount of an oxide converted from the alkali metal in the zeolite used in the present invention, and the amount of an oxide converted from the alkaline earth metal in the zeolite is 5 wt. % or less, preferably 2 wt. % or less, based on the weight of the zeolite. The catalyst having zeolite with a high content of such oxides used in combination with component 1 may be poor in silicon resistance. Thus, the catalyst having zeolite with a low content of the oxides is preferred.

Here, the amount of the oxide converted from the alkali metal refers to the amount of the alkali metal assumed to be present totally as the oxide. The amount of the oxide converted from the alkaline earth metal is defined similarly. There is no limitation on the lower limit of the sum of the amount of the oxide converted from the alkali metal and the amount of the oxide converted from the alkaline earth metal. However, zeolite in which the sum of the amounts of the oxides converted is 0.01 wt. % or more can be acquired easily.

The zeolite used in the catalyst of the present invention may further have the precious metal carried thereon. In this case, the carriage of the precious metal on the alumina and the carriage of the precious metal on the zeolite can be performed simultaneously. For example, the precious metal is carried on a mixture of the alumina and the zeolite, whereby a mixture of the precious metal-carried alumina and the precious metal-carried zeolite is obtained. Further, it is permissible to form a layer containing the alumina and the zeolite on the catalyst substrate, and then carry the precious metal on this layer. Alternatively, the carriage on the alumina and the carriage on the zeolite may be performed separately. The carriage of the precious metal on the zeolite can be performed by using the method described earlier in connection with the alumina.

If the precious metal is carried on the zeolite, the precious metal is preferably selected from Pt, Pd, Rh, Ir and Ru, their alloys, and mixture of these. There is no limitation on the amount of the precious metal in the catalyst, and this amount is determined depending on the form of the catalyst, such as the thickness of the catalyst layer formed on the catalyst substrate, as well as the type of the organic compound in the exhaust gas, and reaction conditions such as the reaction temperature and SV. The amount of the precious metal in component 2 is preferably in the range of 0.5 to 10 wt. %.

The catalyst composition of the present invention contains particles of the precious metal-carried alumina (component 1) and the zeolite (component 2). The proportion of component 2 represented by the following equation:

[weight of component 2/(weight of component 1+weight of component 2)]×100(%)

is 1 wt. % or more, preferably 2 wt. % or more, further preferably 5 wt. % or more, more preferably 8 wt. % or more, even more preferably 10 wt. % or more, but 70 wt. % or less, preferably 50 wt. % or less. If the proportion of component 2 is less than the above range, silicon resistance may fail to be improved sufficiently. If the proportion of component 2 is higher than the above range, removal of the organic compound may be insufficient, and the amount of the expensive zeolite used increases, resulting in poor cost-effectiveness.

In the zeolite having no precious metal carried thereon, the activity in decomposing and removing the organic compound in the exhaust gas is not higher than the limit of detection.

The total proportion of the precious metals in the catalyst composition of the present invention is not limited, but is preferably in the range of 0.5 to 10 wt. %.

The catalyst composition of the present invention may further contain a binder. The incorporation of the binder is advantageous in forming the catalyst layer in a method for producing the catalyst which will be described later. There is no limitation on the binder, and a publicly known binder can be used. Examples of the binder are colloidal silica, alumina sol, silicate sol, and boehmite.

The present invention also relates to a catalyst comprising the catalyst layer formed on the surface of the catalyst substrate, the catalyst layer containing the above-mentioned catalyst composition. There is no limitation on the shape of the substrate used. The preferred shape is such that a differential pressure generated during passage of the gas is small, and the area of contact with the gas is large. Examples include a honeycomb, a sheet, a mesh, a fiber, a pipe, and a filter. There is no limitation on the material for the substrate, and examples of the material are cordierite, alumina, silica alumina, carbon fiber, metal fiber, glass fiber, ceramic fiber, and metal such as stainless steel. The material for the substrate preferably has excellent corrosion resistance and excellent heat resistance.

Formation of the catalyst layer is performed, for example, by the following method: First, component 1, component 2, and the binder are added to water to form a slurry. This slurry is coated onto the substrate, and dried. There is no limitation on the coating method, and publicly known methods can be used, including wash coating and dipping. The average thickness of the catalyst layer is 10 μm or more, preferably 20 μm or more, but 500 μm or less, preferably 300 μm or less. If the thickness of the catalyst layer is less than the above range, the rate of removal of the organic compound may be insufficient. If the above range is exceeded, the exhaust gas does not fully diffuse into the catalyst layer, so that a portion which does not contribute to purification of the exhaust gas is apt to occur in the catalyst layer. In order to obtain a predetermined catalyst layer, coating and drying may be repeated.

Herein, the thickness of the catalyst layer is represented by the following equation:

$$\frac{W \text{ [g/L]}}{TD \text{ [g/cm}^3\text{]} \times S \text{ [cm}^2\text{/L]}} \times 10^4 / \mu m \qquad \text{[Equation 2]}$$

where W denotes the amount (g/L) of the catalyst coating per liter of the substrate, TD denotes the bulk density (g/cm$^3$) of the catalyst layer, and S denotes the surface area (cm$^2$/L) per liter of the substrate.

Examples of the catalyst layer composition according to the present invention are listed in Table 1.

TABLE 1

Composition examples of catalyst layer

|  | Ex. 1 | Ex. 2 | Ex. 3 | Ex. 4 | Ex. 5 | Ex. 6 | Ex. 7 |
|---|---|---|---|---|---|---|---|
| Amount of Pt carriage of comp. 1 (wt. %) | 1.0 | 1.0 | 3.0 | 3.0 | 8.0 | 6.0 | 3.0 |
| Comp. 1:Comp. 2 (weight ratio) | 70:10 | 70:10 | 65:15 | 65:15 | 50:25 | 40:35 | 40:40 |
| Amount of binder* (wt. %) | 25 | 25 | 25 | 25 | 33 | 33 | 25 |
| Amount of Pt in catalyst layer** (g-Pt/m$^2$) | 0.15 | 0.45 | 0.4 | 0.6 | 0.8 | 0.5 | 0.7 |
| Weight of catalyst layer*** (g/m$^2$) | 20 | 50 | 20 | 30 | 20 | 20 | 60 |

*The amount of the binder was expressed as the weight of the binder with respect to the sum of the weights of component 1 and component 2.
**The amount of Pt in the catalyst layer was expressed as the weight of Pt per m$^2$ of the substrate.
***The weight of the catalyst layer was expressed as the weight of (component 1 + component 2 + binder) per m$^2$ of the substrate.

EXAMPLES

The present invention will be described in more detail based on the Examples, which in no way limit the invention.

[Component 1]

Alumina having the precious metal carried thereon (component 1) was prepared in the following manner:

An acidic aqueous solution of dinitrodiaminoplatinum in nitric acid was added to γ-alumina powder (a product of Nikki Universal, mean particle diameter 5 μm, specific surface area 150 m$^2$/g). The mixture was evaporated to dryness, and fired for 2 hours at 500° C. to obtain Pt-carried alumina particles. The amount of Pt carried is as shown below. The amount of Pt carriage is expressed as the weight of Pt carried with respect to the weight of γ-alumina.

| Component 1a | 4.5 wt. % |
|---|---|
| Component 1b | 4.6 wt. % |
| Component 1c | 4.7 wt. % |
| Component 1d | 5.0 wt. % |
| Component 1e | 5.6 wt. % |
| Component 1f | 9.0 wt. % |
| Component 1g | 1.25 wt. % |

Palladium nitrate was used as a source of Pd, and the same method as for 1a to 1g was performed to obtain Pd— and Pd-carried alumina particles described below Component 1h Pt: 1.25 wt. %, Pd: 1.25 wt. %

Component 1i Pt: 1.25 wt. %, Pd: 2.5 wt. %

[Component 2]

The following zeolite was used as component 2.

TABLE 2

Physical properties of various zeolites used as component 2

|  | Specific surface area (m$^2$/g) | Amount of acid (mmol NH$_3$/g) | Mean particle diameter (μm) | SiO$_2$/Al$_2$O$_3$ (molar ratio) | Na content* (wt. %) |
|---|---|---|---|---|---|
| Comp. 2a HY type zeolite (LZY84, UOP) | 750 | 0.8 | 2 | 5.9 | 0.02 |
| Comp. 2b Silicalite (MFI40, UOP) | 400 | 0.6 | 2 | 40 | 0.02 |
| Comp. 2c Mordenite (LSM-8, UOP) | 480 | 0.4 | 2 | 18 | 0.02 |
| Comp. 2d Silicalite (MFI800, UOP) | 400 | 0.09 | 2 | 800 | 0.02 |

*The Na content is expressed as the proportion of the amount of Na$_2$O conversion relative to the weight of zeolite on the assumption that Na is all present as Na$_2$O.

Components 2e to 2i were prepared by carrying Pt and Pd on the HY type zeolite as component 2a by the same method as for components 1a to 1i. The amounts of Pt and Pd carried are as follows:

| Component 2e | Pt: 0.5 wt. % |
|---|---|
| Component 2f | Pt: 1.25 wt. % |
| Component 2g | Pt: 4.5 wt. % |
| Component 2h | Pt: 1.25 wt. %, Pd: 1.25 wt. % |
| Component 2i | Pt: 1.25 wt. %, Pd: 2.5 wt. % |

[Catalyst]

<Catalyst A>

Component 1a (200 g) and 50 g of boehmite as a binder were mixed, and the mixture was added to a mixture of 25 g of 60% nitric acid and 725 g of demineralized water to form a slurry. This slurry was coated onto a cordierite honeycomb (a product of NGK Insulators, 200 cells/square inch), as a substrate, by the wash coat method. The excess slurry was blown off by compressed air, and the coating was dried in a dryer for 3 hours at 150° C. Then, the coated product was fired in air for 2 hours at 500° C., and then heated in a hydrogen atmosphere for 1 hour at 500° C. to obtain catalyst A.

<Catalyst B>

Component 1a (196 g), 4 g of component 2a, and 50 g of boehmite were mixed, and the mixture was added to a mixture of 25 g of 60% nitric acid and 725 g of demineralized water, followed by thorough stirring, to form a slurry. This slurry was coated onto the same cordierite honeycomb as used for catalyst A by the wash coat method. The excess slurry was blown off by compressed air, and the coating was dried in a dryer for 3 hours at 150° C. Then, the coated product was fired in air for 2 hours at 500° C., and then heated in a hydrogen atmosphere for 1 hour at 500° C. to obtain catalyst B.

<Catalyst C to Catalyst F>

Catalyst C to catalyst F were produced by the same procedure as performed for catalyst B. The types and amounts of component 1 and component 2 used in the production are as shown in Table 3.

Unless otherwise specified, the weight of the binder with respect to the sum of the weights of component 1 and component 2 was 25 wt. % for any of the catalysts in the Examples. The surface area (S) of cordierite used was 22,400 $cm^2/L$. The bulk density (TD) of the catalyst layer was assumed to be 0.8 $g/cm^3$. Unless otherwise specified, the value described as the precious metal content in the table represents the weight percentage of the precious metal relative to the sum of the weights of component 1 and component 2.

TABLE 3

Catalyst composition and catalytic activity
Effect of addition of zeolite

|  | Cat. A | Cat. B | Cat. C | Cat. D | Cat. E | Cat. F |
|---|---|---|---|---|---|---|
| Comp. 1 | Comp. 1a 200 g | Comp. 1b 196 g | Comp. 1c 190 g | Comp. 1d 180 g | Comp. 1e 160 g | Comp. 1f 100 g |
| Comp. 2 | — | Comp. 2a 4 g | Comp. 2a 10 g | Comp. 2a 20 g | Comp. 2a 40 g | Comp. 2a 100 g |
| Comp. 1:comp. 2 (weight ratio) | 100:0 | 98:2 | 95:5 | 90:10 | 80:20 | 50:50 |
| Amount of Pt in catalyst layer** (g-Pt/$m^2$) | 0.8 | 0.8 | 0.8 | 0.8 | 0.8 | 0.8 |
| Initial activity (MEK removal rate %) | 98 | 97 | 97 | 97 | 97 | 97 |
| Activity after 400 min (MEK removal rate %) | 10 | 40 | 64 | 76 | 85 | 90 |

*For any of the catalysts, 27 g of the catalyst layer, per $m^2$ of the substrate, was formed.
**The amount of Pt in the catalyst layer was expressed as the weight of Pt per $m^2$ of the substrate.

[Exhaust Gas Treatment Test 1]

Catalysts A to F were each packed into a reactor, and an exhaust gas treatment test 1 was conducted. The test was carried out by keeping the catalyst layer at 300° C., passing the exhaust gas through the reactor at a space velocity (SV) of 50,000 $hr^{-1}$, and analyzing the composition of the gas flowing out of the reactor. The composition of the exhaust gas is as follows:

| Methyl ethyl ketone (MEK) | 500 ppm |
|---|---|
| Dimethyl siloxane | 2.5 ppm as Si |
| Water | 2 vol % |
| Air | Remainder |

Herein, the space velocity was expressed as the flow rate of the exhaust gas divided by the volume of the substrate.

Figure 1:
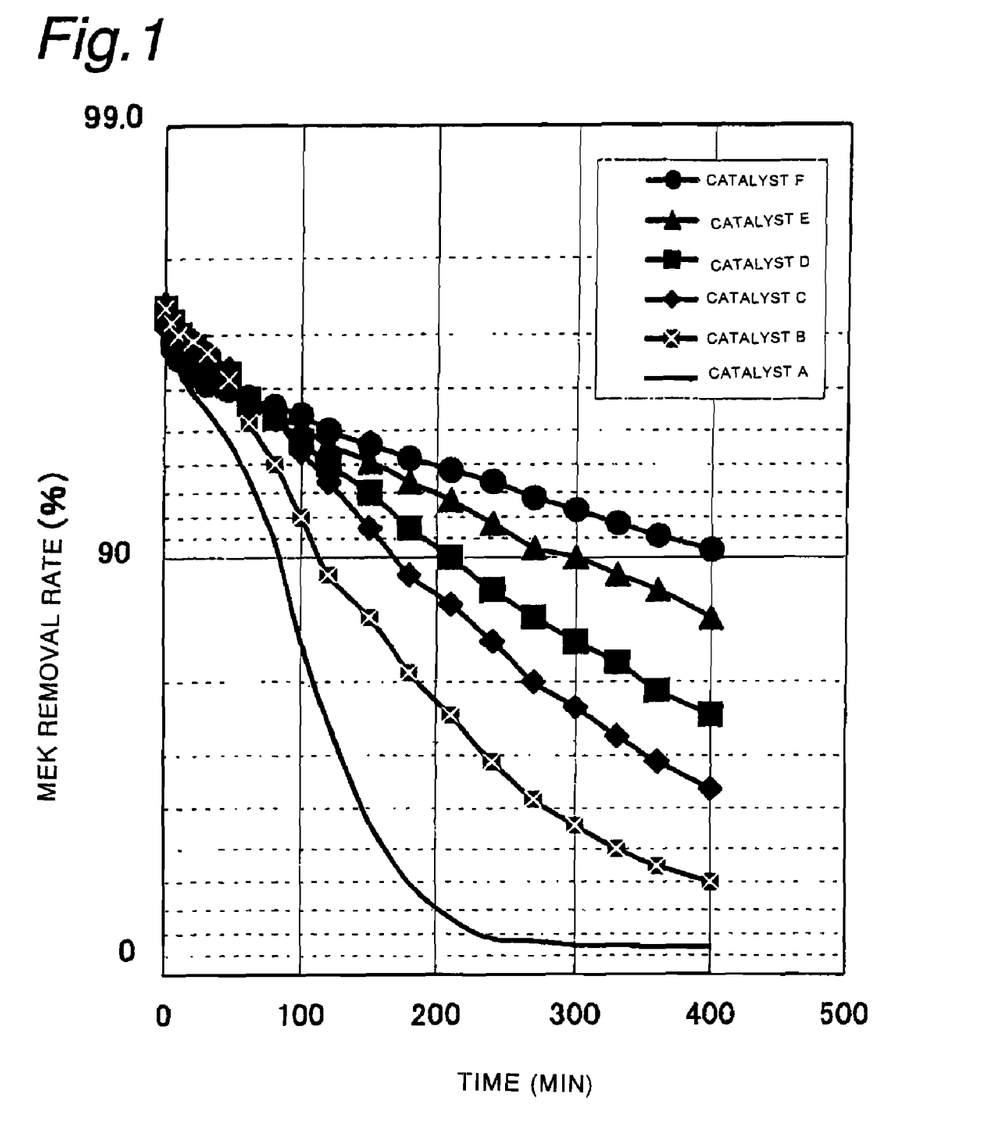
FIG. 1 shows changes over time in the MEK removal rate of various catalysts.

Changes over time in the catalytic activity are shown in FIG. 1. Table 3 shows a comparison of the MEK removal rates 400 minutes after initiation of passage of the exhaust gas through the different catalysts. The MEK concentration in the untreated exhaust gas was measured on the gas sampled at the inlet of the reactor, while the MEK concentration in the exhaust gas after treatment was measured on the gas sampled at the outlet of the reactor.

When the catalyst layer contained no zeolite (catalyst A), it is seen that the initial MEK removal rate was as high as 98%, but declined to 10% after 400 minutes, showing poor silicon resistance. When 2 wt. % of zeolite was incorporated (catalyst B), the initial performance was not impaired, and the MEK removal rate after 400 minutes was markedly improved to reach 40%. These results show that the addition of a small amount of zeolite to precious metal-carried alumina markedly improves silicon resistance. Further increases in the amount of zeolite (catalysts C to F) improved the removal rate after 400 minutes up to 90%. As will be described later, the MEK removal rate of catalyst L produced only with zeolite was not more than the limit of detection even in the initial stage (see Table 6).

[Effect of the Amount of Acid of Zeolite on Silicon Resistance]

<Catalyst G to Catalyst I>

Catalyst G to catalyst I were produced by the same procedure as performed for catalyst B, and the above-described exhaust gas treatment test 1 was conducted. The types and amounts of component 1 and component 2 used in the production are as shown in Table 4. The difference among catalyst G to catalyst I is that the zeolites used are different. Catalyst G used HY-type zeolite having an amount of acid of 0.8 mmol $NH_3$/g, catalyst H used mordenite having an amount of acid of 0.4 mmol $NH_3$/g, and catalyst I used silicalite having an amount of acid of 0.1 mmol $NH_3$/g.

TABLE 4

Catalyst composition and catalytic activity
Effect of amount of acid of zeolite

|  | Catalyst G | Catalyst H | Catalyst I |
|---|---|---|---|
| Component 1 | Component 1a 160 g | Component 1a 160 g | Component 1a 160 g |
| Component 2 | Component 2a 40 g | Component 2c 40 g | Component 2d 40 g |
| Amount of acid of component 2 (mmol $NH^3$/g) | 0.8 | 0.4 | 0.1 |
| Component 1:component 2 (weight ratio) | 80:20 | 80:20 | 80:20 |
| Amount of Pt in catalyst layer** (g-Pt/$m^2$) | 0.8 | 0.8 | 0.8 |
| Initial activity (MEK removal rate %) | 97 | 97 | 97 |
| Activity after 400 min (MEK removal rate %) | 85 | 60 | 10 |

*For any of the catalysts, 27 g of the catalyst layer, per $m^2$ of the substrate, was formed.
**The amount of Pt in the catalyst layer was expressed as the weight of Pt per $m^2$ of the substrate.

The MEK removal rate after 400 minutes was 85% in catalyst G, but it was 60% in catalyst H, and it was decreased to 10% in catalyst I. Thus, it is found advantageous to use zeolite having a large amount of acid.

Catalyst B to catalyst I were each prepared by coating the substrate with the slurry having component 1 and component 2 mixed therein. On the other hand, catalysts J and K shown below were prepared by coating the substrate with both components in different steps. Thus, it is considered that in the catalyst layer of each of catalyst B to catalyst I, both components are mixed more uniformly and coexistent as compared with catalyst J to catalyst K.

Hence, the exhaust gas treatment test of catalysts J and K was conducted to investigate an influence which the form of existence of component 1 and component 2 exerts on catalytic performance.

<Catalyst J>

Component 1f and boehmite were mixed at a weight ratio of 80:20, and the mixture was added to a mixture of 60% nitric acid and demineralized water (60% nitric acid:demineralized water=1:29 (weight ratio)) to form a slurry. This slurry was coated onto the same cordierite honeycomb as used for catalyst E by the wash coat method. The excess slurry was blown off by compressed air, and the coating was dried in a dryer for 3 hours at 150° C. to form a layer of component 1f.

Then, component 2a and silica sol were mixed at a weight ratio of 80:20, and the mixture was added to a mixture of 60% nitric acid and demineralized water (weight ratio 1:29) to form a slurry. This slurry was coated onto the above-mentioned layer of component 1f. The excess slurry was blown off by compressed air, and the coating was dried in a dryer for 3 hours at 150° C. to form a layer of component 2a.

Then, the coated product was calcined in air for 2 hours at 500° C., and then heated in a hydrogen atmosphere for 1 hour at 500° C. to obtain catalyst J.

In catalyst J, therefore, the upper layer (thickness 18 μm) containing component 2a was formed on the lower layer (thickness 18 μm) containing component 1f.

<Catalyst K>

Catalyst J was prepared by the same method as for catalyst I, except that the sequence of the step of forming the layer of component 1f and the step of forming the layer of component 2a was reversed. In catalyst J, the upper layer (thickness 18 μm) containing component 1f was formed on the lower layer (thickness 18 μm) containing component 2a.

The aforementioned exhaust gas test was conducted on catalysts J and K. The results are shown in Table 5 and FIG. 3. Table 5 also describes, for comparison, the results on catalyst F which was produced by mixing component 2a and component 1f and coating the substrate with the mixture.

TABLE 5

Influence of method of catalyst production on
catalytic performance

|  | Catalyst J | Catalyst K | Catalyst F |
|---|---|---|---|
| Upper layer | Component 2a | Component 1f | Mixture of components 1f and 2a |
| Lower layer | Component 1f | Component 2a | |
| Component 1:component 2 (weight ratio) | 50:50 | 50:50 | 50:50 |
| Amount of Pt in catalyst layer* (g-Pt/$m^2$) | 0.8 | 0.8 | 0.8 |
| Initial activity (MEK removal rate %) | 92 | 97 | 97 |
| Activity after 400 min (MEK removal rate %) | 86 | 71 | 90 |

*The amount of Pt in the catalyst layer was expressed as the weight of Pt per $m^2$ of the substrate.

Figure 3:
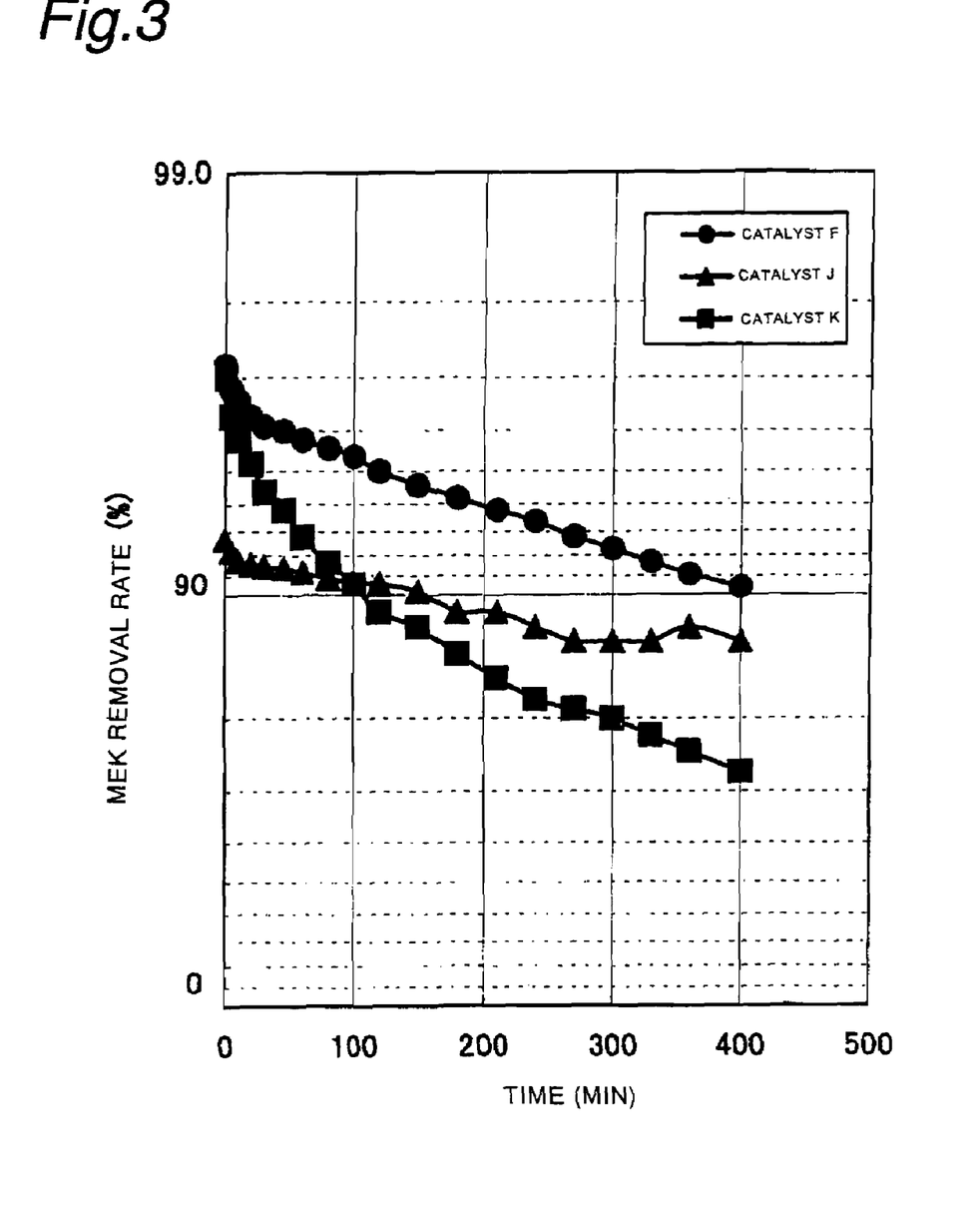
FIG. 3 shows the effect of the form of the catalyst layer on silicon resistance. The silicon resistance was evaluated by the MEK removal rate after passage of the exhaust gas for 400 minutes.

Catalyst J having the layer of component 1 as the lower layer and the layer of component 2 as the upper layer was much inferior in the initial activity to catalyst F having the catalyst layer formed by coexistence of components 1 and 2. Catalyst K having the upper and lower layers of catalyst I stacked in reversed order showed a great decrease over time in the catalytic performance.

These results show that the presence of the particles of component 1 and component 2 in adjoining state in the catalyst layer exerts a synergistic action on catalytic performance.

[Effect of Mixing of Pt-Carried Alumina and Zeolite]

<Catalyst L (Zeolite Alone)>

Catalyst L was prepared by the same procedure as performed for catalyst A, except that component 2a was used in place of component 1a. The exhaust gas treatment test 1 was conducted on catalyst L.

The aforementioned catalyst A was used as the catalyst having Pt-carried alumina alone.

TABLE 6

Effect of mixing of Pt-carried alumina and precious metal-uncarried zeolite

|  | Catalyst E (Pt-carried alumina + zeolite) | Catalyst A (Pt-carried alumina) | Catalyst L (zeolite) |
|---|---|---|---|
| Component 1 | Component 1e | Component 1a | — |
| Component 2 | Component 2a | — | Component 2a |
| Component 1:component 2 (weight ratio) | 80:20 | 100:0 | 0:100 |
| Pt content (wt. %) | 4.5 | 4.5 | 0.0 |
| Initial activity (MEK removal rate %) | 97.0 | 98.0 | 0.0 |
| Activity after 400 min (MEK removal rate %) | 85.5 | 10.0 | 0.0 |

Figure 2:
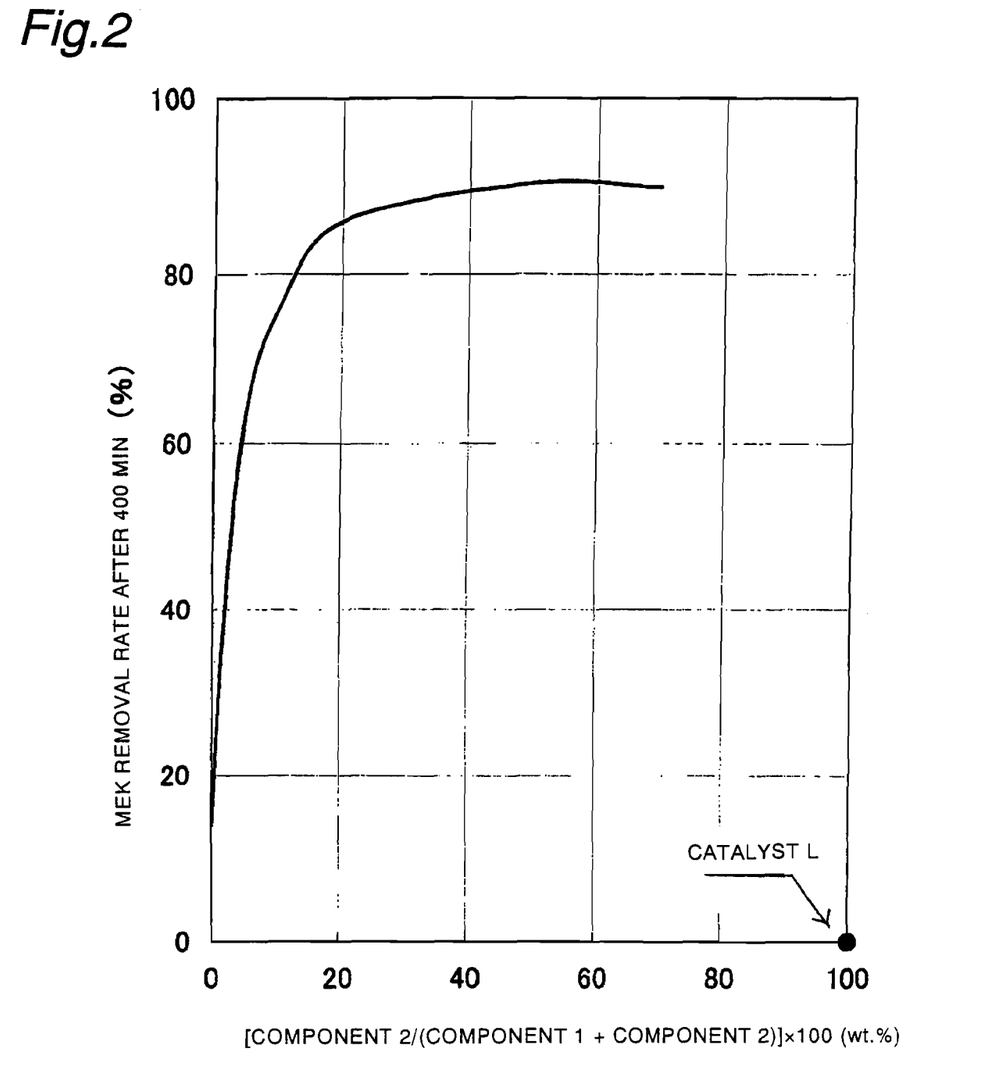
FIG. 2 shows the effect of the amount of component 2 in the catalyst layer on silicon resistance. The silicon resistance was evaluated by the MEK removal rate after passage of the exhaust gas for 400 minutes.

As shown in Table 6, performance was markedly improved by mixing Pt-carried alumina and zeolite in comparison with using Pt-carried alumina alone and zeolite alone. A marked increase in the MEK removal rate by the addition of zeolite to Pt-carried alumina is shown in FIG. 2 as well.

[Precious Metal Carriage on Zeolite]

<Catalyst M (Pt-carried alumina+Pt-carried zeolite); catalyst N (Pt-carried alumina alone); catalyst O (Pt-carried zeolite alone)>

Catalysts M to O were produced by the same procedure as performed for catalyst B. The types and amounts of component 1 and component 2 used in the production are as shown in Table 7.

TABLE 7

Performance of catalyst containing Pt-carried alumina and Pt-carried zeolite

|  | Catalyst M (Pt-carried alumina + Pt-carried zeolite) | Catalyst N (Pt-carried alumina) | Catalyst O (Pt-carried zeolite) |
|---|---|---|---|
| Component 1 | Component 1g | Component 1g | — |
| Component 2 | Component 2f | — | Component 2f |
| Component 1:component 2 (weight ratio) | 50:50 | 100:0 | 0:100 |
| Pt content (wt. %) | 1.25 | 1.25 | 1.25 |
| Initial activity (MEK removal rate %) | 96.5 | 96.3 | 97.2 |
| Activity after 400 min (MEK removal rate %) | 84.0 | 5.0 | 82.0 |

<Catalysts P and Q (Pt-carried alumina+Pt-carried zeolite); catalyst R (Pt-carried zeolite alone)>

Catalysts P to R were produced by the same procedure as performed for catalyst B. The aforementioned catalyst A was used as the catalyst having Pt-carried alumina alone. The types and amounts of component 1 and component 2 used in the production are as shown in Table 8.

TABLE 8

Performance of catalysts containing Pt-carried alumina and Pt-carried zeolite

|  | Catalyst P (Pt-carried alumina + Pt-carried zeolite) | Catalyst Q (Pt-carried alumina + Pt-carried zeolite) | Catalyst A (Pt-carried alumina) | Catalyst R (Pt-carried zeolite) |
|---|---|---|---|---|
| Component 1 | Component 1a | Component 1a | Component 1a | — |
| Component 2 | Component 2e | Component 2e | — | Component 2e |
| Component 1:component 2 (weight ratio) | 80:20 | 50:50 | 100:0 | 0:100 |
| Pt content (wt. %) | 3.7 | 2.5 | 4.5 | 0.5 |
| Initial activity (MEK removal rate %) | 97.0 | 96.8 | 98.0 | 96.8 |
| Activity after 400 min (MEK removal rate %) | 85.5 | 84.2 | 10.0 | 65.0 |

<Catalysts S and T (Pt-carried alumina+Pt-carried zeolite); catalyst O (Pt-carried zeolite alone)>

Catalysts S to O were produced by the same procedure as performed for catalyst B. The aforementioned catalyst A was used as the catalyst having Pt-carried alumina alone. The types and amounts of component 1 and component 2 used in the production are as shown in Table 9.

TABLE 9

Performance of catalysts containing Pt-carried alumina and Pt-carried zeolite

|  | Catalyst S (Pt-carried alumina + Pt-carried zeolite) | Catalyst T (Pt-carried alumina + Pt-carried zeolite) | Catalyst A (Pt-carried alumina) | Catalyst O (Pt-carried zeolite) |
|---|---|---|---|---|
| Component 1 | Component 1a | Component 1a | Component 1a | — |
| Component 2 | Component 2f | Component 2f | — | Component 2f |

TABLE 9-continued

Performance of catalysts containing Pt-carried alumina and Pt-carried zeolite

|  | Catalyst S (Pt-carried alumina + Pt-carried zeolite) | Catalyst T (Pt-carried alumina + Pt-carried zeolite) | Catalyst A (Pt-carried alumina) | Catalyst O (Pt-carried zeolite) |
|---|---|---|---|---|
| Component 1:component 2 (weight ratio) | 80:20 | 50:50 | 100:0 | 0:100 |
| Pt content (wt. %) | 3.85 | 2.88 | 4.5 | 1.25 |
| Initial activity (MEK removal rate %) | 97.1 | 96.8 | 98.0 | 97.2 |
| Activity after 400 min (MEK removal rate %) | 85.0 | 87.0 | 10.0 | 82.0 |

Catalysts M to T were subjected to the exhaust gas treatment test 1. The results are shown in Tables 7 to 9.

Catalytic performance is found to be improved by mixing Pt-carried alumina and Pt-carried zeolite in comparison with the catalyst containing Pt-carried alumina alone and the catalyst containing Pt-carried zeolite alone.

[Substitution of Pt-Carried Zeolite by Pt-Carried Alumina]
<Catalysts U and V (Pt-Carried Alumina+Pt-Carried Zeolite); Catalyst W (Pt-Carried Zeolite Alone)>

Catalysts U to W were produced by the same procedure as performed for catalyst B. The aforementioned catalyst A was used as the catalyst having Pt-carried alumina alone. The types and amounts of component 1 and component 2 used in the production are as shown in Table 10.

Catalysts U to W were subjected to the exhaust gas treatment test 1. The results are shown in Table 10.

[Effect of Pt and Pd Used in Combination]
<Catalysts X and Y (Pt/Pd-Carried Alumina+Pt/Pd-Carried Zeolite)>

Catalysts X and Y were produced by the same procedure as performed for catalyst B. The types and amounts of component 1 and component 2 used in the production are as shown in Table 11.

In connection with catalysts X and Y, an exhaust gas treatment test 2 was conducted in addition to the aforementioned exhaust gas treatment test 1. The exhaust gas treatment test 2 is a test in which the catalyst is heat-treated for 4 hours at 650° C. in an air atmosphere, and is then evaluated for MEK removal activity under the same conditions as those in the exhaust gas treatment test 1.

TABLE 10

Performance of catalysts containing Pt-carried alumina and Pt-carried zeolite

|  | Catalyst U (Pt-carried alumina + Pt-carried zeolite) | Catalyst V (Pt-carried alumina + Pt-carried zeolite) | Catalyst A (Pt-carried alumina) | Catalyst W (Pt-carried zeolite) |
|---|---|---|---|---|
| Component 1 | Component 1a | Component 1a | Component 1a | — |
| Component 2 | Component 2g | Component 2g | — | Component 2g |
| Component 1:component 2 (weight ratio) | 80:20 | 50:50 | 100:0 | 0:100 |
| Pt content (wt. %) | 4.5 | 4.5 | 4.5 | 4.5 |
| Initial activity (MEK removal rate %) | 97.4 | 97.9 | 98.0 | 97.4 |
| Activity after 400 min (MEK removal rate %) | 87.0 | 94.1 | 10.0 | 92.4 |

With catalysts U and V, it is found that performance comparable to that of catalyst W having Pt-carried zeolite alone is obtained even when the amount of zeolite used is cut down and replaced by alumina.

Figure 4:
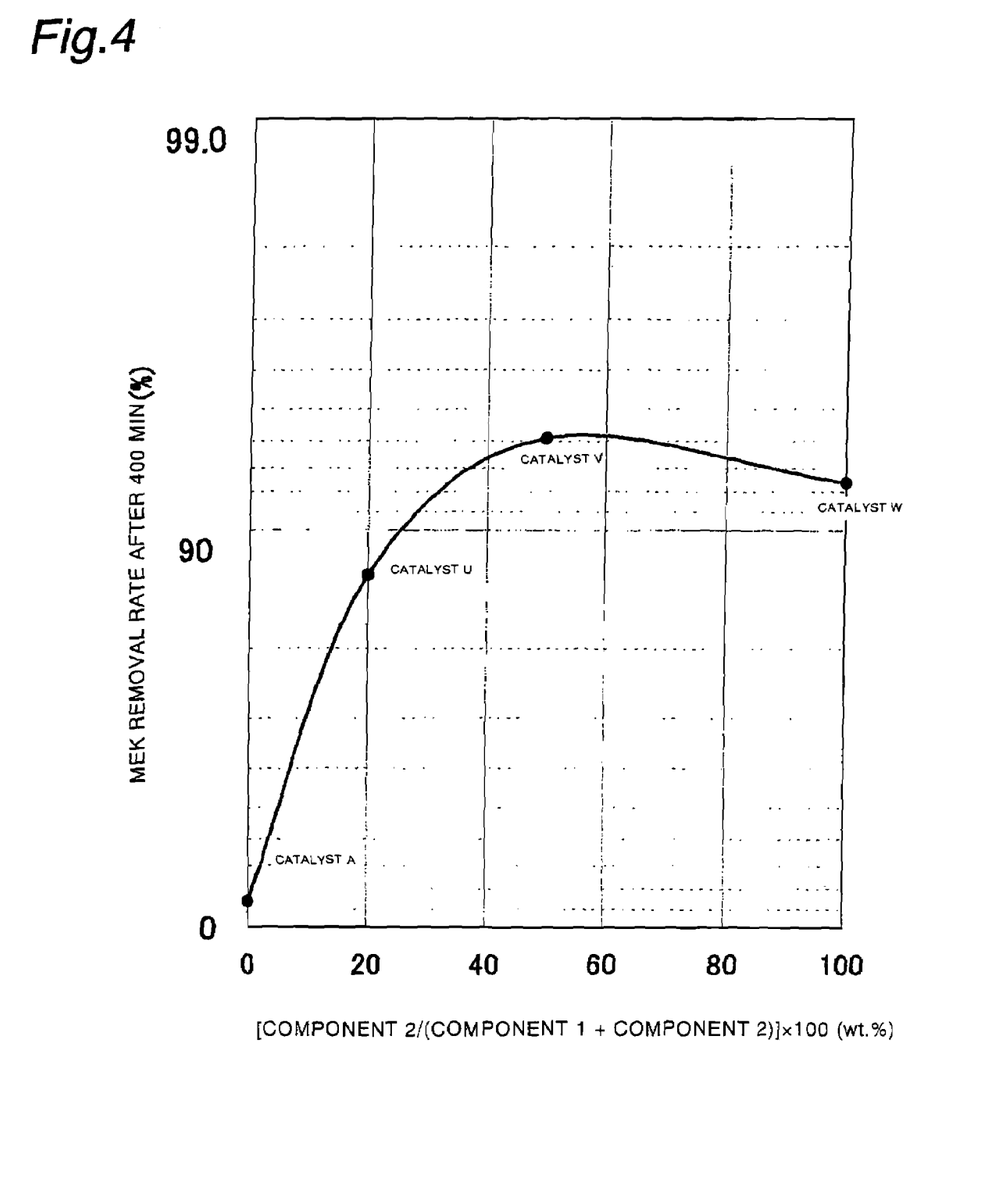
FIG. 4 shows the effect of changes in the ratio of Pt-carried alumina/Pt-carried zeolite on catalytic performance in connection with the catalyst with a Pt content of 4.5 wt. %.

Catalysts A, U, V and W all have the same Pt content of 4.5 wt. %, but they are different in the ratio of Pt-carried alumina/Pt-carried zeolite. In these catalysts, the MEK removal rates after 400 minutes in the exhaust gas treatment test 1 were compared in FIG. 4. The results show that excellent catalytic performance is obtained even when zeolite is replaced by inexpensive alumina.

TABLE 11

Effect of Pt and Pd used in combination

|  | Catalyst X (Pt/Pd-carried alumina + Pt/Pd-carried zeolite) | Catalyst Y (Pt/Pd-carried alumina + Pt/Pd-carried zeolite) |
|---|---|---|
| Component 1 | Component 1h | Component 1i |
| Component 2 | Component 2h | Component 2i |

TABLE 11-continued

Effect of Pt and Pd used in combination

| | Catalyst X (Pt/Pd-carried alumina + Pt/Pd-carried zeolite) | Catalyst Y (Pt/Pd-carried alumina + Pt/Pd-carried zeolite) |
|---|---|---|
| Component 1:component 2 (weight ratio) | 50:50 | 50:50 |
| Pt content (wt. %) | 1.25 | 1.25 |
| Pd content (wt. %) | 1.25 | 2.5 |
| Evaluation test example 1 Initial activity (MEK removal rate %) | 96.5 | 96.6 |
| Evaluation test example 1 Activity after 400 min (MEK removal rate %) | 82 | 83 |
| Evaluation test example 2 Initial activity (MEK removal rate %) | 92.3 | 95.7 |
| Evaluation test example 2 Activity after 400 min (MEK removal rate %) | 70 | 80 |

As shown in Table 11, the combined use of Pd and Pt is found to improve catalytic performance under the conditions involving thermal stress applied by the heat treatment at 650° C.

[Effect of Pt Carriage on Zeolite]

Figure 5:
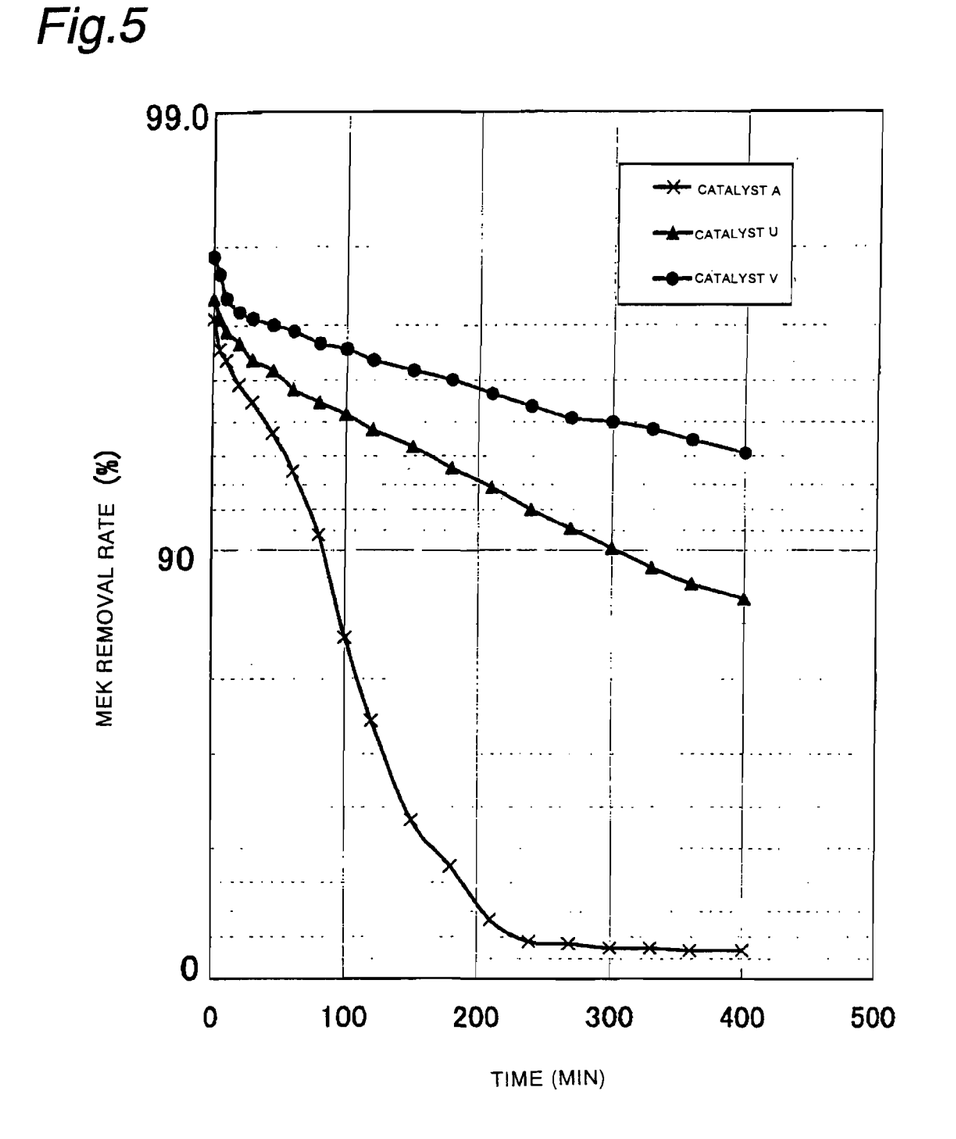
FIG. 5 shows the effect of Pt carriage on zeolite on catalytic performance in connection with the catalyst with a Pt content of 4.5 wt. %.

Catalysts A and V both have the same Pt content of 4.5 wt. %, but they are different in that catalyst F has Pt carried on alumina alone, while catalyst V has Pt carried on both of alumina and zeolite. The results of the exhaust gas treatment test 1 on both catalysts are shown in FIG. 5. As shown in FIG. 5, catalytic performance is improved by carrying Pt on zeolite as well.

INDUSTRIAL APPLICABILITY

According to the present invention, the silicon resistance of a catalyst is improved by mixing zeolite with precious metal-carried alumina. Hence, the catalyst of the present invention can maintain its performance for a long term, and can be used at high SV.

The invention claimed is:

1. A catalyst composition for purifying an exhaust gas containing an organic compound and a silicon compound, the catalyst composition comprising:
    alumina particles having a precious metal carried thereon, and zeolite particles having a precious metal carried thereon, wherein the amount of precious metal carried on the alumina particles is in the range of 0.5 wt. % to 10 wt. % of the alumina particles, and the amount of precious metal carried on the zeolite particles is in the range of 0.5 wt. % to 10 wt. % of the zeolite particles, wherein:
    a proportion of a weight of the zeolite particles relative to a sum of a weight of the alumina particles and the weight of the zeolite particles is in a range of 1 wt. % to 70 wt. %, and
    the zeolite particles are capable of absorbing 0.6 to 1.5 mmol $NH_3$ at 160° C. to 550° C. per gram of the zeolite particles.

2. The catalyst composition according to claim 1, further containing a binder.

3. The catalyst composition according to claim 1, wherein the precious metal is Pt, Pd, Rh, Ir or Ru, an alloy of any of these, or a mixture of these.

4. The catalyst composition according to claim 1, wherein the zeolite comprises an alkali metal oxide, an alkaline earth metal oxide, or both, and wherein a sum of an amount of the alkali metal oxide and an amount of the alkaline earth metal oxide in the zeolite is 5 wt. % or less based on a total amount of the zeolite.

5. A catalyst comprising:
    a catalyst substrate; and
    a catalyst layer formed on the catalyst substrate and containing the catalyst composition according to claim 1.

6. The catalyst according to claim 5, wherein an average thickness of the catalyst layer is in a range of 10 to 500 μm.

7. The catalyst composition of claim 1, wherein the zeolite particles are selected from the group consisting of HY zeolites, X zeolites, A zeolites, and any combination thereof.

8. The catalyst composition of claim 7, wherein the zeolite particles comprise said HY zeolites, and said HY zeolites have a $SiO_2/Al_2O_3$ molar ratio in the range of 5 to 50.

* * * * *